United States Patent [19]

Huveteau

[11] Patent Number: 4,543,988

[45] Date of Patent: Oct. 1, 1985

[54] STOP WHICH SETTLES IN A DEVICE BORE

[75] Inventor: Jean L. Huveteau, Fressenneville, France

[73] Assignee: S.A. Robinetterie, S.F.R., Fressenneville, France

[21] Appl. No.: 501,827

[22] Filed: Jun. 7, 1983

[30] Foreign Application Priority Data

Jun. 9, 1982 [FR] France .................. 82 10540

[51] Int. Cl.⁴ .......................................... F16K 17/04
[52] U.S. Cl. .................... 137/542; 137/522; 251/337; 267/170; 267/177; 411/521
[58] Field of Search ............. 267/166, 170, 177; 251/337; 411/517, 521; 137/540, 542, 543; 138/89; 308/DIG.11; 384/585; 277/35, 37, 47–49, 51, 181, 186, 188 R, 189, 190, 191, 212 C

[56] References Cited

U.S. PATENT DOCUMENTS

| | | | |
|---|---|---|---|
| 1,047,341 | 12/1912 | Upton | 138/89 X |
| 2,594,641 | 4/1952 | Griffith | 137/543 |
| 2,654,620 | 10/1953 | Tinnerman | 138/89 |
| 2,712,262 | 7/1955 | Knohl | 411/521 |
| 3,075,779 | 1/1963 | Holdham | 277/37 |
| 3,308,847 | 3/1967 | Vmann | 137/505.42 X |
| 3,320,846 | 5/1967 | Orain | 411/521 |
| 3,741,615 | 6/1973 | Otto | 277/37 X |
| 4,078,722 | 3/1978 | Luckenbill | 137/542 X |
| 4,245,667 | 1/1981 | Braukmann | 137/540 X |

FOREIGN PATENT DOCUMENTS

| | | | |
|---|---|---|---|
| 16793 | of 1894 | United Kingdom | 138/89 |
| 565100 | 10/1944 | United Kingdom | 138/89 |

Primary Examiner—Robert G. Nilson
Attorney, Agent, or Firm—Kerkam, Stowell, Kondracki & Clarke

[57] ABSTRACT

The invention relates to a stop which is locked in position a bore of an operative device as well as to a device provided with at least one such stop. The stop is adapted for use particularly with, but not exclusively, with a safety valve. The stop includes a skirt adapted to be received in a bore and having at one end (29) by which it is connected to a centering dish (26), a diameter which adjusts itself practically without play in the bore (30) designed to receive the stop. At a second free end (31) the skirt has a diameter prior to positioning in the bore which is larger than that of the bore (30) intended to receive the stop so that, during the assembly, the skirt is compressed by the walls of the bore and thereafter, by reaction, it is forcibly pressed against the walls of the bore (30).

13 Claims, 11 Drawing Figures

STOP WHICH SETTLES IN A DEVICE BORE

BACKGROUND OF THE INVENTION

1. Field of the Invention

The invention relates to a stop which settles in a device bore as well as to the device provided with at least one such stop adapted for use particularly in, but not exclusively in, a safety valve.

2. Description of the Prior Art

Safety valves comprise a body consisting of a chamber into which lead three channels. A first channel accommodates a spring which constantly stresses a valve toward a seat positioned in a duct or passage interposed between the chamber and a second channel which is connected to the source of fluid whose pressure is to be limited.

The valve consists of a dish or diaphragm by means of which said valve is pressed against its seat. The valve accommodates a seal on its face opposite to that which supports the diaphragm and, the valve receives, directly or by means of at least one part, such as a washer or a centering cup, the pressure of the spring which must rest beneath a stop connected to the body so as to enable its spacing relative to its seat to be adjusted and, thereby to adjust the pressure of the calibration of the spring.

As long as the pressure of this fluid remains below that at which the spring has been set, the valve remains pressed against the seat to shut off the passage interconnecting the channels. As soon as this pressure reaches at least the pressure at which the spring has been set, the valve rises from its seat and the fluid invades the chamber from where it escapes by means of the third channel, which is usually connected to a discharge circuit or conduct.

The support stop of the spring is also freely traversed in axial direction by a manual-lift rod whose head is gripped by an operating key.

Heretofore, for the connection to the body of the stop under which the spring is pressed directly or indirectly, this stop is usually screwed into the bore of the body or onto the external surface of the channel. This mode of installation, which requires elaborate machining operations and a relatively long setup time, results in a relatively high cost of production.

To eliminate this disadvantage, it is common practice to use stops made of steel plate hollowed out in such a way as to form a spring-centering dish to the edge of which is connected by a slight round-off a skirt which rises concentrically to the dish until about half-way before flaring into a relatively large truncated collar.

When this stop is fitted tight in its bore, taking account of the conical shape of the collar, the skirt tends to pull back elastically, whereas, when the spring pushes on the bottom of the dish, the edge of the collar is pressed in the wall of the bore, resulting in self-locking.

Unfortunately, since it presses only with its collar against the bore wall, this hollowed-out steel plate stop is not very stable.

To overcome this drawback, it is common practice to wedge in the dish a guide which cooperates, for example, with the manual-lift rod. However, this construction results in a cost price which is at least as high as for a screwed assembly.

SUMMARY OF THE INVENTION

One result which the invention aims to obtain is a stop which is very stable, of low cost and easy to assemble.

Therefore, the object of the invention is a stop of the type mentioned above including a skirt, particularly characterized by the fact that the skirt has at its end by which it is connected to the dish, a diameter which adjusts itself practically without play in the bore designed to receive the stop; and at its free end, prior to assembly, a diameter which is larger than that of the bore designed to receive the stop so that during mounting the skirt is compressed by the bore and thereafter, by reaction, it is forcibly pressed against the bore.

BRIEF DESCRIPTION OF THE DRAWINGS

The invention will be better understood from a consideration of the ensuing description by way of nonlimitative example, reference being had to the accompanying drawing which shows schematically in.

DESCRIPTION OF THE PREFERRED EMBODIMENTS

Figure 1:
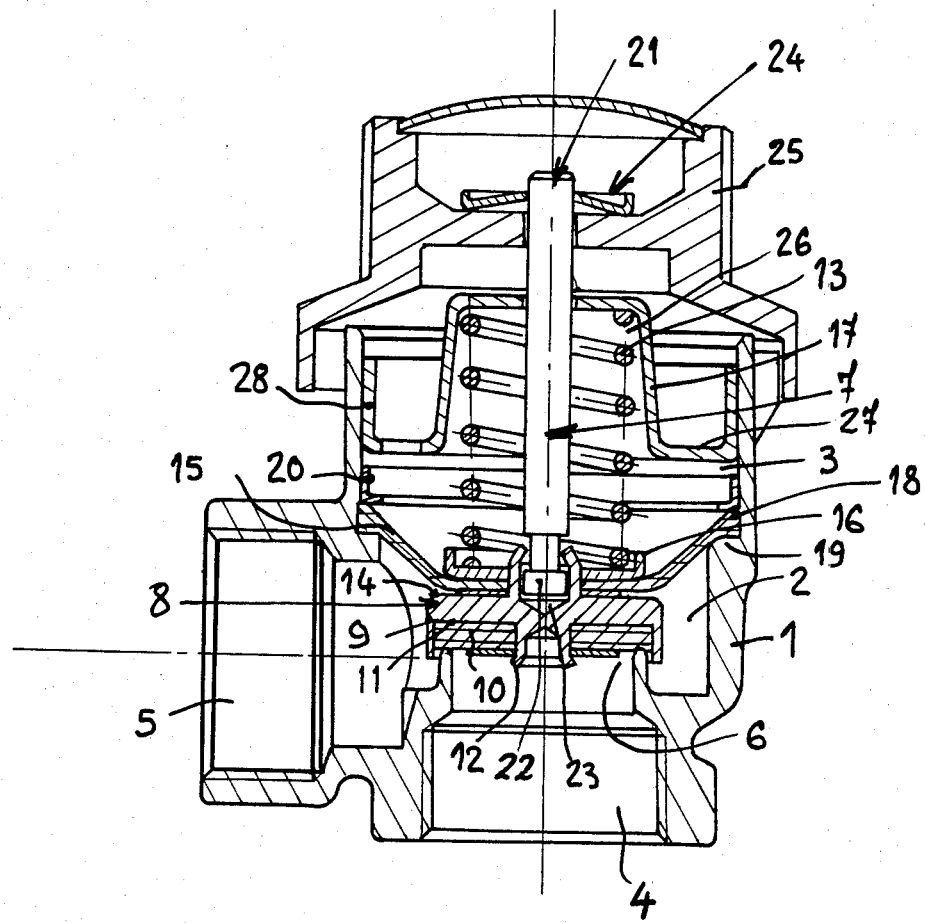
FIG. 1 shows a valve provided with a stop according to the invention.
Figure 2:
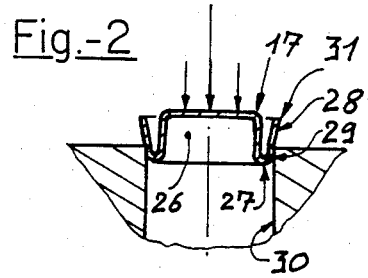
FIG. 2 is a diagramatic view of the stop during assembly.

Now, referring to the drawing, and in particular to FIG. 1, it is seen that the valve comprises a body 1 which forms a central chamber 2 into which lead inlet channels 3, 4 and 5, one of which communicates with the chamber 2 by means of a passage forming the seat 6 of a shut-off device 7 mainly comprised of a valve 8 formed by a dish 9 which accommodates a seal 10. This seal is pinched against the bottom 11 of the dish 9 by fixing means 12.

By means of this seal 10 the valve presses against the seat 6 under the action of a spring 13 which presses against the opposite rear surface 14 of the valve directly or, as in the example shown, by means of a membrane or diaphragm barrier 15 and a support-and-centering cup 16 adapted to receive the base of the spring 13.

The spring 13 rises in the body 1 and is located in front of the seat 6 in chamber 2 so that its upper part rests under a stop 17 which is adjustably connected to the body 1.

The median portion of the membrane or diaphragm barrier 15 is pinched between the centering 16 cup and the rear surface 14 of the valve with all the force of the spring and is sealingly connected to said valve. In order to obtain a seal between the body 1 and the outer edge 18 of the membrane or diaphragm barrier 15, the edge is pressed against a flange 19 machined for this purpose in the body and pinched there against by any means as known from the prior art, such as a readily removable ring 20 or by clamping or screwing onto the body of the sleeve which accommodates the spring 13.

To enable manual control of the valve, the shut-off device 7 includes a manual-lift rod 21 having a foot 22 captured in a housing 23 provided at the rear of the valve, while its head is gripped by a key 24 which is mainly formed by, for example, a handwheel 25. However, this gripping action by the key 24 occurs only after the rod 21 has freely traversed the spring 13 and the stop 17 below which this spring is held.

In a manner known in the prior art, stop 17 is fitted tight in the channel 3 and includes a centering dish 26 for spring 13. Dish 26 has its edge 27 joined to a skirt 28 which rises upwardly and concentrically to the walls of the dish.

According to one feature of the invention, the skirt has, as best shown in FIGS. 2-11, an end 29 by which it is joined to the dish 26 which has a diameter which adjusts itself practically without play in the bore 30 designed to receive the stop. Bore 30 corresponds to channel 3 of FIG. 1. At its free end 31, prior to assembly, the skirt has a diameter which is larger than that of the bore 30 intended to receive the stop so that during the mounting the skirt is compressed by the walls of the bore and thereafter, by reaction, is forcibly pressed against the walls of the bore 30.

Figure 3:
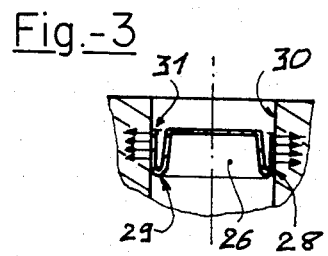
FIG. 3 is a diagramatic view of the stop after it has been mounted in the bore.
Figure 4:
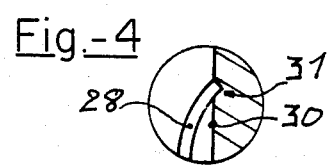
FIG. 4 is a fragmentary view on a larger scale showing a detail derived from FIG. 3.

Even if, particularly in the situation where the skirt may be prebent or precurved, the latter tends to curve or bend as shown in FIG. 4. The stop remains quite stable in the bore because of the support which is provided by the walls, the skirt exerting a force against the wall as shown by the arrows in FIG. 3.

Prebending or precurving can be effected in such a way that the edge of the end can get a firm footing against the wall of the bore so as to ensure self-locking and irreversibility of movement.

Regardless of its application such as in the valve of FIG. 1, or in order to seat a spring (FIG. 5), this stop can also be used to wedge any other parts 32, such as antifriction bearings (FIG. 6) and/or serve as a barrier against certain substances, that is to say, serve as a sealing means, e.g., as a simple stopper or plug (FIG. 3).

The stop can be made from any plastic or metallic material which resists elastic deformation.

Preferably, its cross section corresponds to that of the body which receives it, i.e. it is circular for a cylindrical body, rectangular for a rectangular body, etc.

Figure 7:
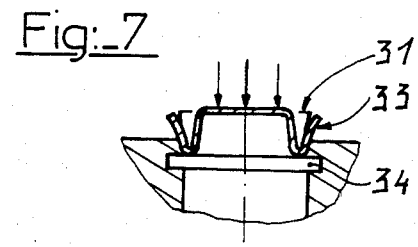
FIGS. 7-9 illustrate a variant form of the stop according to the invention.
Figure 8:
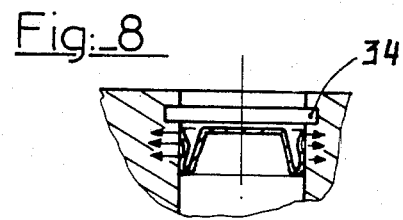
Figure 9:
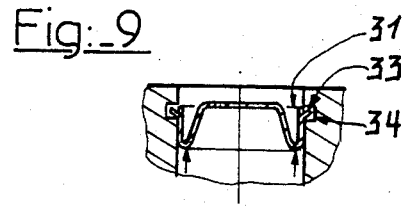
Figure 5:
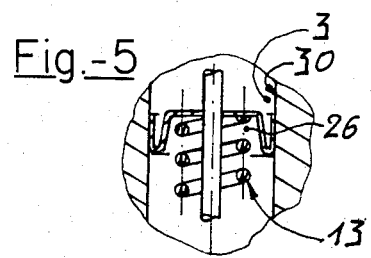
FIGS. 5 and 6 illustrate two applications of the stop of the invention.
Figure 10:
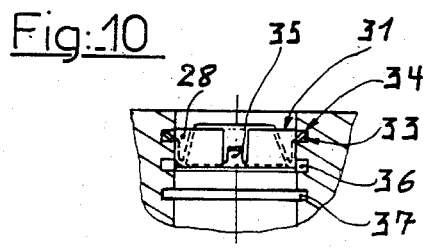
FIGS. 10 and 11 illustrate another variant form of the stop according to the invention.
Figure 6:
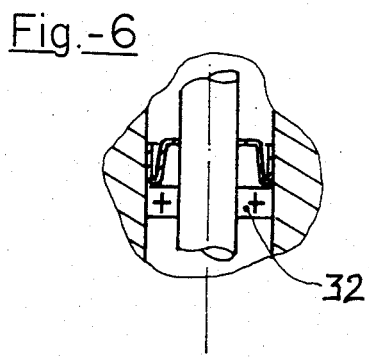
Figure 11:
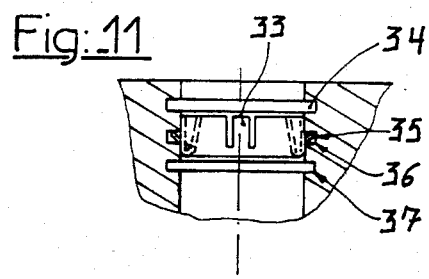

In one embodiment of the invention (FIGS. 7-9), on the one hand, at the free end 31 of the skirt there is cut at least one notch to provide a projection 33 which, prior to assembly, is curved rather deeply away from its axis toward the exterior and, on the other hand, there is machined in the bore 30 at least one groove 34 which is capable of receiving the projection 33 to ensure a perfect blocking of the stop. As shown in FIGS. 7-9, the stop may be pushed downward into the bore beyond the groove. Upon return, the projection 33 springs into the groove and presents further upward movement.

In another embodiment of the invention (FIGS. 10 and 11), the free end 31 of the skirt 28 is provided with several projections 33, 35 which extend at different distances from the free end 31 of the skirt 28 so as to provide an adjustable position for the stop member. In still another embodiment of the invention, the bore has several grooves 34, 36, 37 arranged in vertically spaced positions along the wall of the bore. The function of these notches and/or grooves is to permit a keying or locking at numerous levels, and also to ensure a pre-assembly of the elements to enable calibration of the spring.

I claim:

1. A stop which is adapted to be locked in position in a bore of an operative device having the bore and to be fitted in tight engagement with the walls of the bore, the stop being a unitary member comprising a centering dish having a generally cylindrical wall portion with a diameter less than the diameter of the bore, the dish adapted to be positioned in the bore with an axis of the cylindrical wall portion aligned with the axis of the bore, said dish having a substantially cylindrical skirt with a first end connected to an edge of the cylindrical wall portion, said skirt being shaped to extend concentrically about and axially with respect to said cylindrical wall portion so as to form a double concentric wall dish, said skirt having at the first end a diameter which adjusts itself practically without play in said bore and having a second free end with, prior to positioning in the bore, a diameter which is larger than that of the bore in which the stop is received so that, upon insertion of the stop into the bore, the skirt is compressed by the walls of the bore and the periphery of the skirt is forcibly pressed into engagement with the walls of the bore over a substantial portion of the axial length of the skirt.

2. The stop according to claim 1, wherein the free end of the skirt has at least one projection which, prior to positioning of the skirt in the bore is curved away from the axis of the skirt relatively deeply toward the exterior, and wherein the bore has at least one groove capable of receiving the projection to ensure locking of the stop within the bore in a position determined by location of the groove.

3. The stop according to claim 1 wherein the free end of the skirt includes several projections which extend at different distances from the free end of the skirt.

4. A stop which is adapted to be locked in position in a bore of an operative device and to be fitted in tight engagement with the walls of the bore, the stop comprising a centering dish adapted to be positioned in the bore with an axis of the dish aligned with the axis of the bore, said dish having a skirt with a first end connected to an edge of the dish, said skirt being shaped to extend concentrically about and axially with respect to said dish, said skirt having at the first end a diameter which adjusts itself practically without play in said bore and having a second free end with, prior to positioning in the bore, a diameter which is larger than that of the bore in which the stop is received so that, upon insertion of the stop into the bore, the skirt is compressed by the walls of the bore and the periphery of the skirt is forcibly pressed into engagement with the walls of the bore, the free end of the skirt including several projections which extend at different distances from the free end, and wherein the bore has several axially spaced grooves adapted to receive at least one of said projections for adjustably positioning the stop.

5. A stop which is adapted to be locked in position in a bore of an operative device and to be fitted in tight engagement with the walls of the bore, the stop comprising a centering dish adapted to be positioned in the bore with an axis of the dish aligned with the axis of the bore, said dish having a skirt with a first end connected to an edge of the dish, said skirt being shaped to extend concentrically about and axially with respect to said dish, said skirt having at the first end a diameter which adjusts itself practically without play in said bore and having a secnd free end with, prior to positioning in the bore, a diameter which is larger than that of the bore in which the stop is received so that, upon insertion of the stop into the bore, the skirt is compressed by the walls of the bore and the periphery of the skirt is forcibly pressed into engagement with the walls of the bore, wherein the free end of the skirt includes several projections which extend at different distances from the free end of the skirt, at least one projection being curved away from the axis of the skirt relatively deeply toward the exterior, and wherein the bore has at least one groove capable of receiving such one projection to ensure locking of the stop within the bore in a position determined by the groove.

6. The stop according to claim 5, wherein the bore has several grooves adapted to receive at least one said projections for adjustably positioning the stop within the bore.

7. A valve having a body, a chamber, a plurality of channels into said chamber including an inlet channel, an outlet channel and a central channel defined by a bore in the body, a valve element controlling communication between the inlet and outlet channel, a diaphragm supporting said valve element and being supported in the bore, a stop member tightly fitted in the bore, a spring positioned between the stop member and the diaphragm, said stop member including a centering dish receiving one end of the spring and a skirt having a first end connected to an edge of said dish, said skirt having a peripheral wall which extends concentrically and axially with respect to the dish, the first end having a diameter which adusts itself practically without play in the bore and the skirt having a second free end with a diameter, prior to positioning of the stop in the bore, which is larger than that of the bore so that, upon placement of the stop in the bore, the peripheral wall of the skirt is compressed by the walls of the bore and thereafter, by reaction, is forcibly pressed against the walls of the bore.

8. The valve according to claim 7, wherein the free end of the skirt has at least one projection which, prior to positioning, is curved away from the axis of the skirt relatively deeply and the bore has at least one groove capable of receiving the projection to ensure locking of the stop within the bore.

9. The valve according to claim 8, wherein the free end of the skirt includes several notches, projections which extend at different distances from the free end of the skirt.

10. The valve according to claim 9, wherein the bore has several grooves adapted to receive at least one said projections for adjustably positioning said stop.

11. The valve according to claim 7 wherein the free end of the skirt includes several projections which extend at different distances from the free end of the skirt.

12. The valve according to claim 11, wherein the bore has several grooves adapted to receive at least one projection for adjustably positioning the stop.

13. The valve of claim 7, wherein the skirt is substantially cylindrical and is formed such that when the stop is inserted into the bore, the peripheral surface of the skirt engages the walls of the bore over a substantial portion of the axial length of the skirt.

* * * * *

UNITED STATES PATENT AND TRADEMARK OFFICE
CERTIFICATE OF CORRECTION

PATENT NO. : 4,543,988

DATED : October 1, 1985

INVENTOR(S) : Jean L. HUVETEAU

It is certified that error appears in the above-identified patent and that said Letters Patent is hereby corrected as shown below:

At Column 6, line 13 (line 2 of Claim 9), delete "notches,"

Signed and Sealed this

Fourth Day of February 1986

[SEAL]

Attest:

DONALD J. QUIGG

Attesting Officer

Commissioner of Patents and Trademarks